Oct. 23, 1934.  E. J. ABBE  1,977,815
INDUSTRIAL TRUCK
Filed Jan. 29, 1931  9 Sheets-Sheet 1

Oct. 23, 1934.  E. J. ABBE  1,977,815
INDUSTRIAL TRUCK
Filed Jan. 29, 1931  9 Sheets-Sheet 2

Inventor
Edward J. Abbe
By Bates, Golrick & Teare
Attorneys

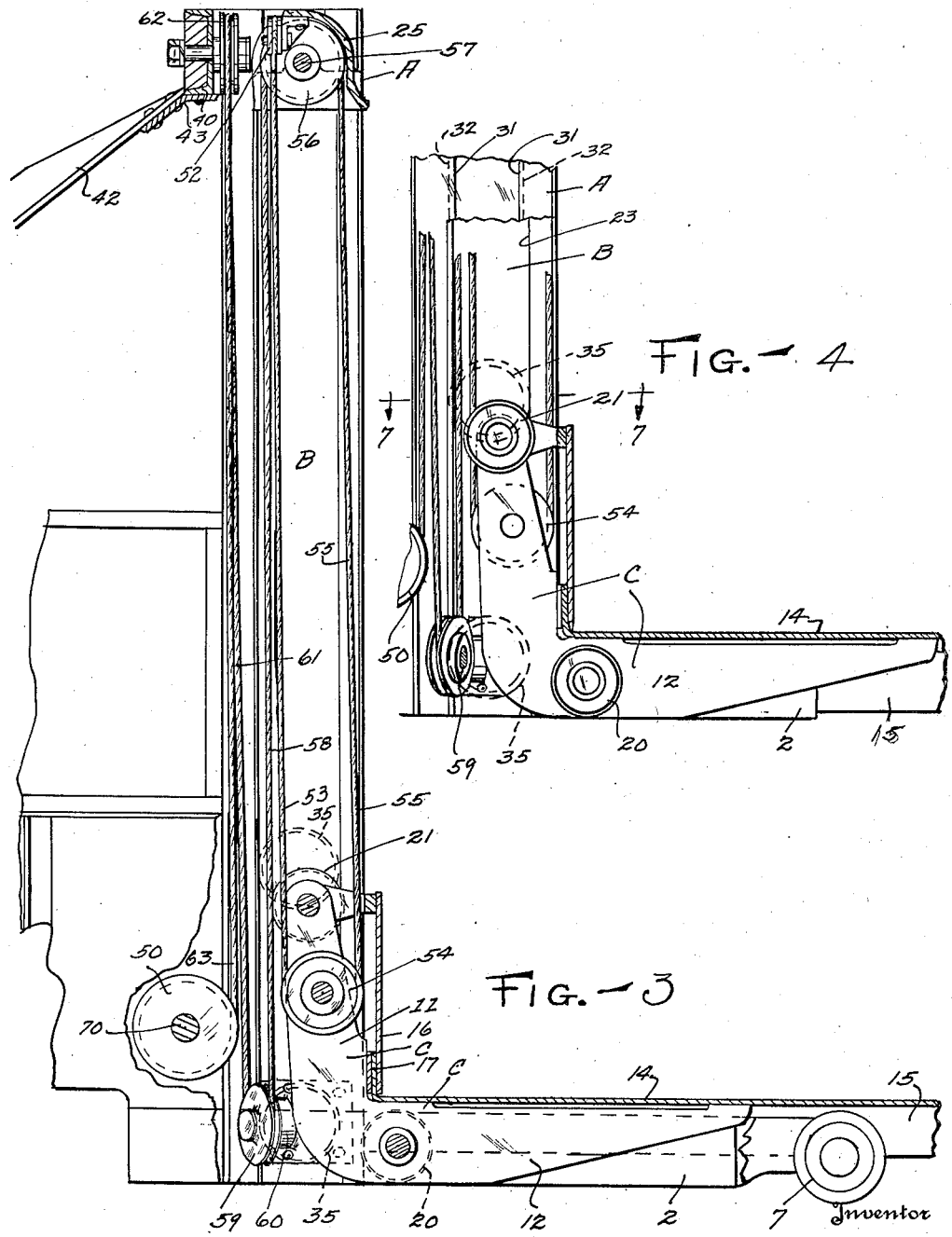

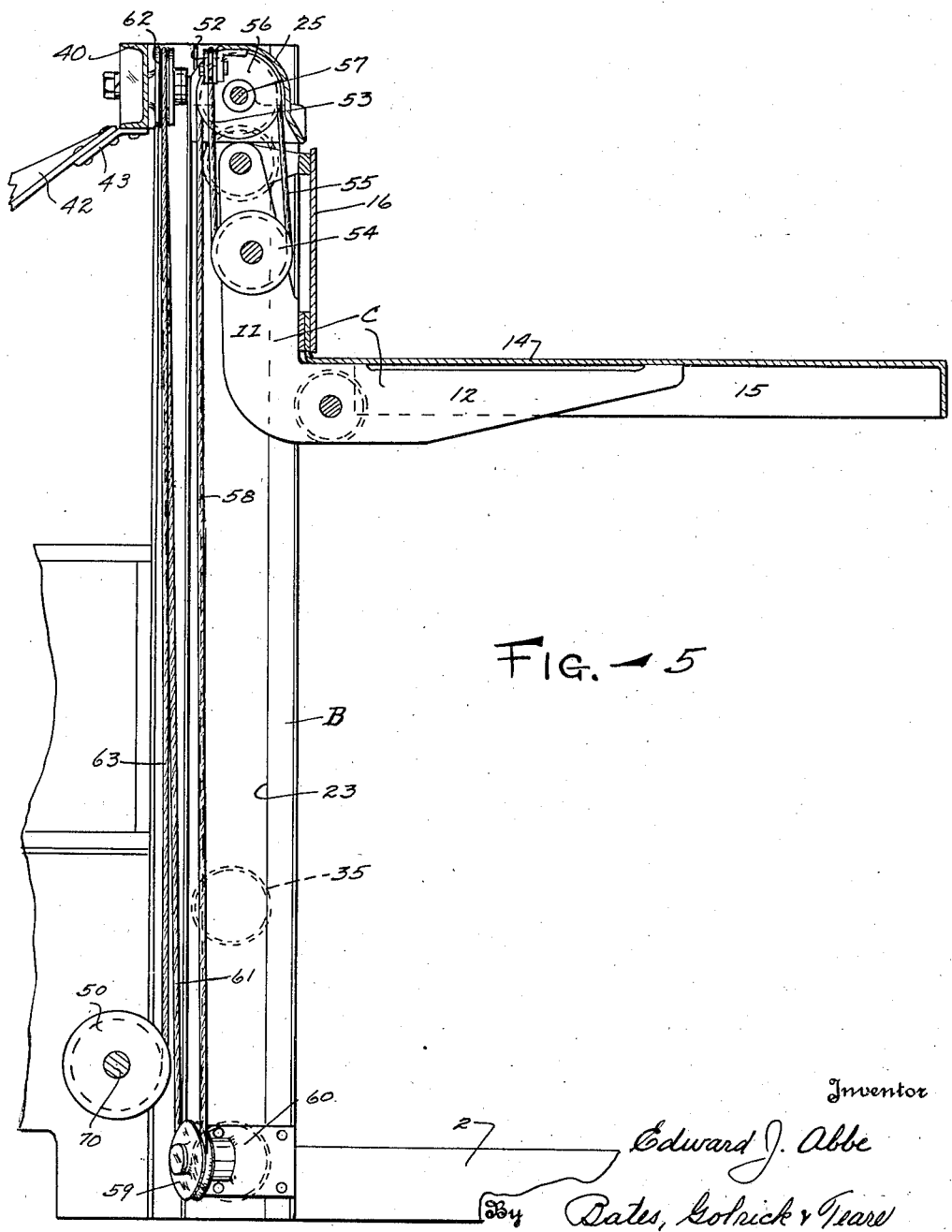

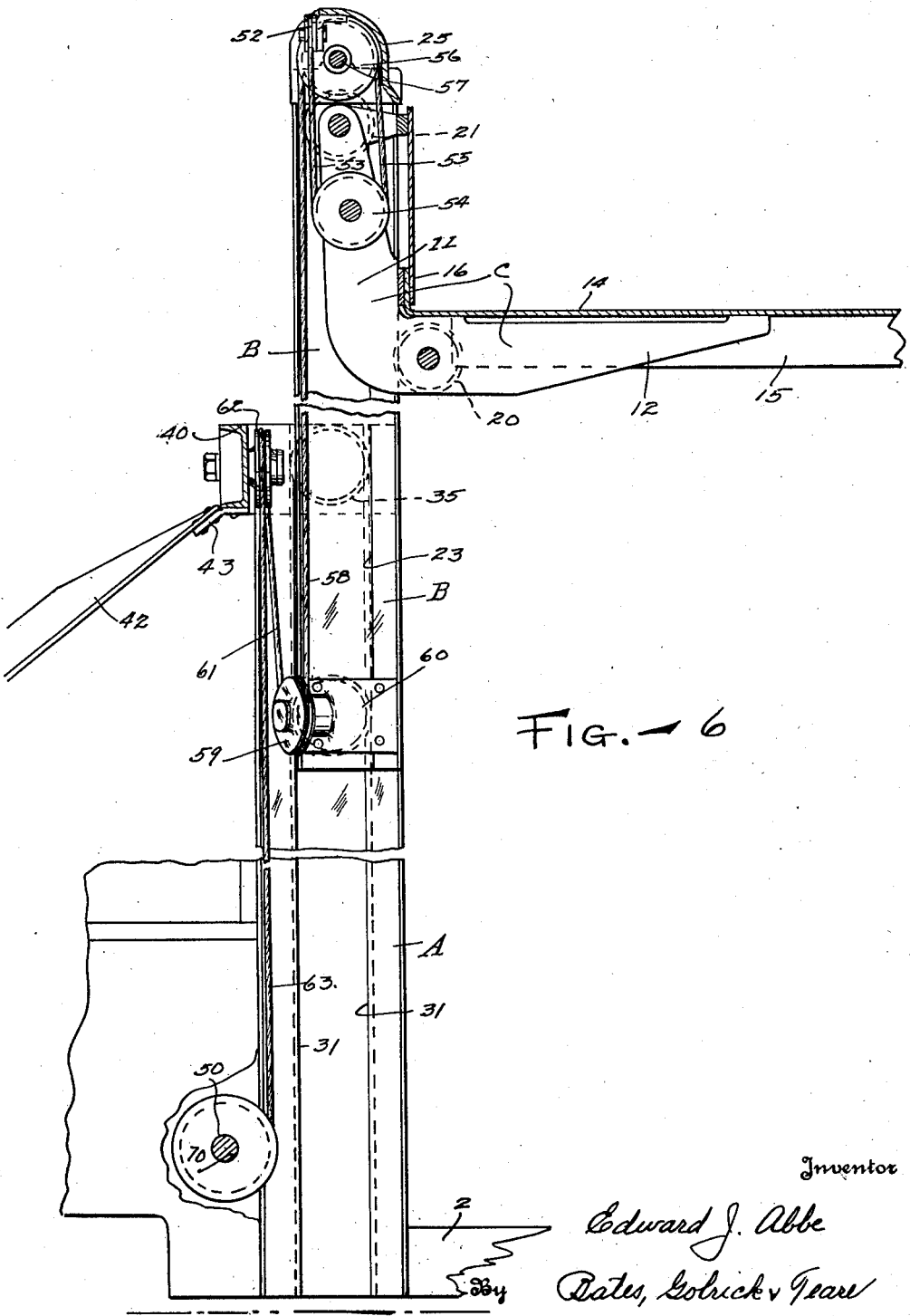

Oct. 23, 1934.  E. J. ABBE  1,977,815
INDUSTRIAL TRUCK
Filed Jan. 29, 1931  9 Sheets-Sheet 6
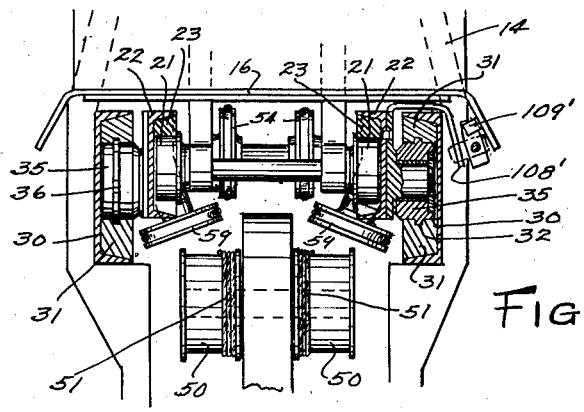
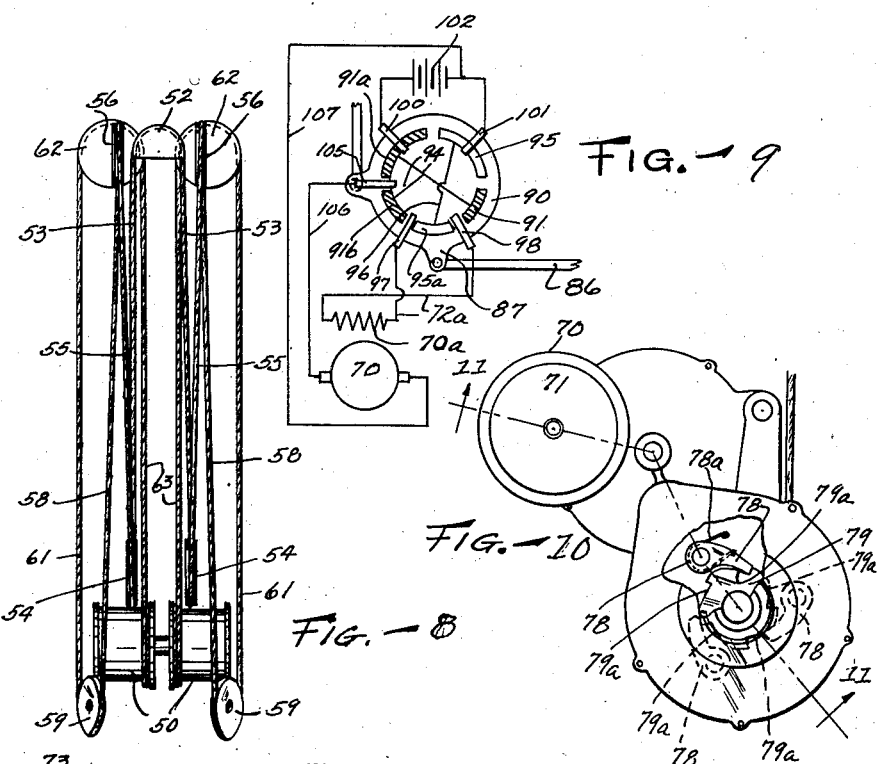
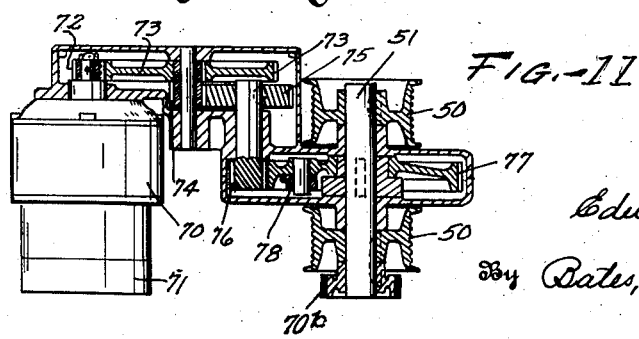
Inventor
Edward J. Abbe
By Bates, Goldrick & Teare
Attorneys Oct. 23, 1934.  E. J. ABBE  1,977,815
INDUSTRIAL TRUCK
Filed Jan. 29, 1931    9 Sheets-Sheet 8
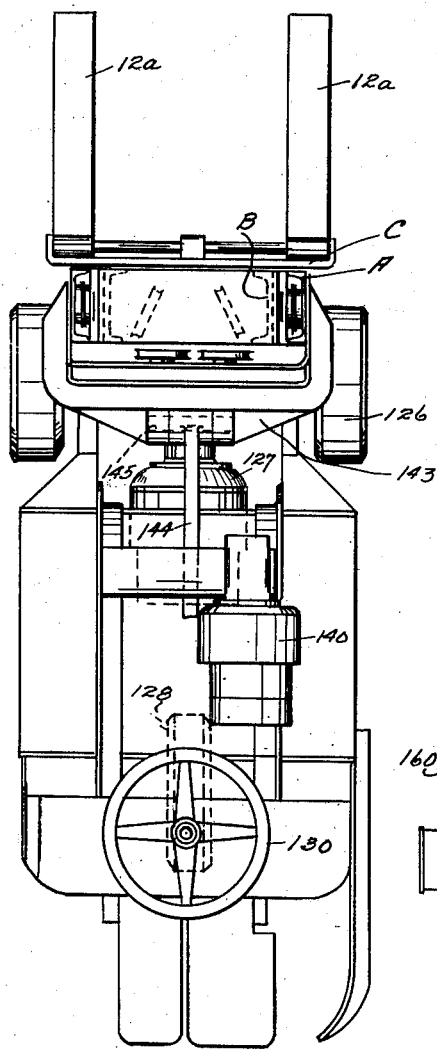
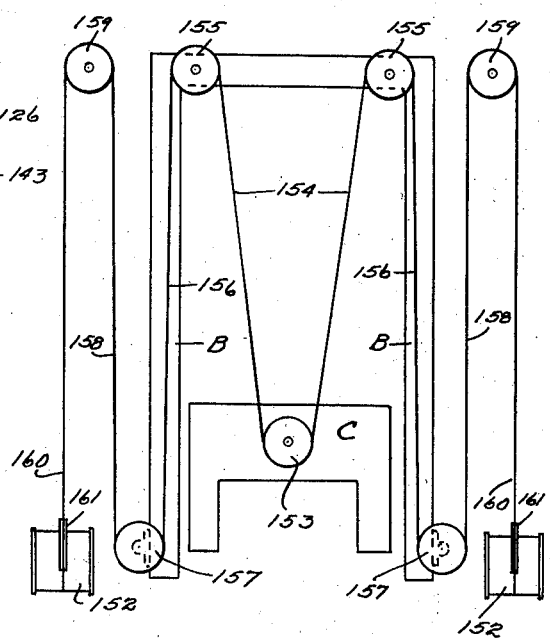
FIG.-14
FIG.-13
Inventor
Edward J. Abbe
By Bates, Goldrick & Teare
Attorneys

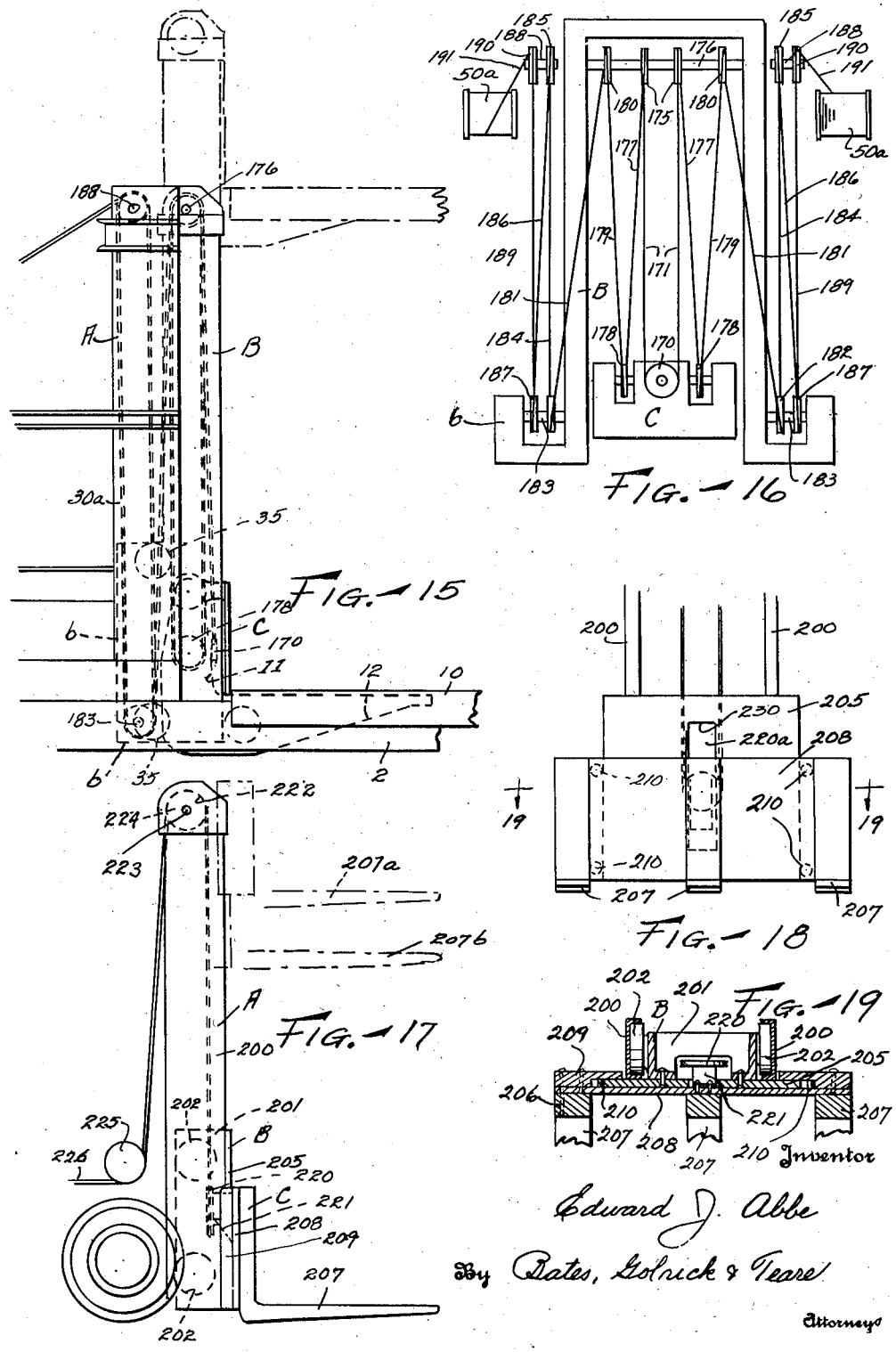

Patented Oct. 23, 1934

1,977,815

UNITED STATES PATENT OFFICE 1,977,815

INDUSTRIAL TRUCK

Edward J. Abbe, Cleveland Heights, Ohio, assignor to The Elwell-Parker Electric Company, Cleveland, Ohio, a corporation of Ohio Application January 29, 1931, Serial No. 511,980

9 Claims. (Cl. 187—11)

The present invention relates to industrial trucks and particularly to trucks adapted for tiering. An object is to provide a tiering truck of high lift capacity which will be efficient in operation, strong and rugged in construction and capable of being economically manufactured.

A further object is to provide a general utility tier lift truck capable of handling very heavy loads for ordinary lifting or tiering operations, but being also adaptable, substantially without adjustment, for safely handling loads to lift and/or stack the same at unusual heights.

Another object is to provide a simple and convenient arrangement for mounting a movable elevator guide on a fixed elevator guide in such manner that tendency for the movable guide to sway or get out of alignment with the fixed guide will be effectively overcome.

Another object is to provide an improved and efficient cable and sheave arrangement for a high lift tiering truck.

Other objects include providing a high lift tiering truck in which the necessary load lifting elements are effectively arranged to be automatically controlled to limit the relative movement of said elements and thereby prevent damage to the mechanism, notwithstanding some carelessness on part of the operator in controlling the lifting power; and also to provide an efficient automatic controlling arrangement for such elements.

A specific object is to provide a control arrangement which is adjustable to limit the upward movement of a load lifting device at two heights, one in case of operating on heavy loads in ordinary lifting or tiering operations and the other in the case of lifting or tiering at unusually high elevations.

Other objects include the general simplification and improvement of high lift tiering trucks of the class shown.

Various other novel aspects of the invention will become apparent from the following description relating to the accompanying drawings showing the preferred forms. The essential novel characteristics are summarized in the claims.

Figure 1:
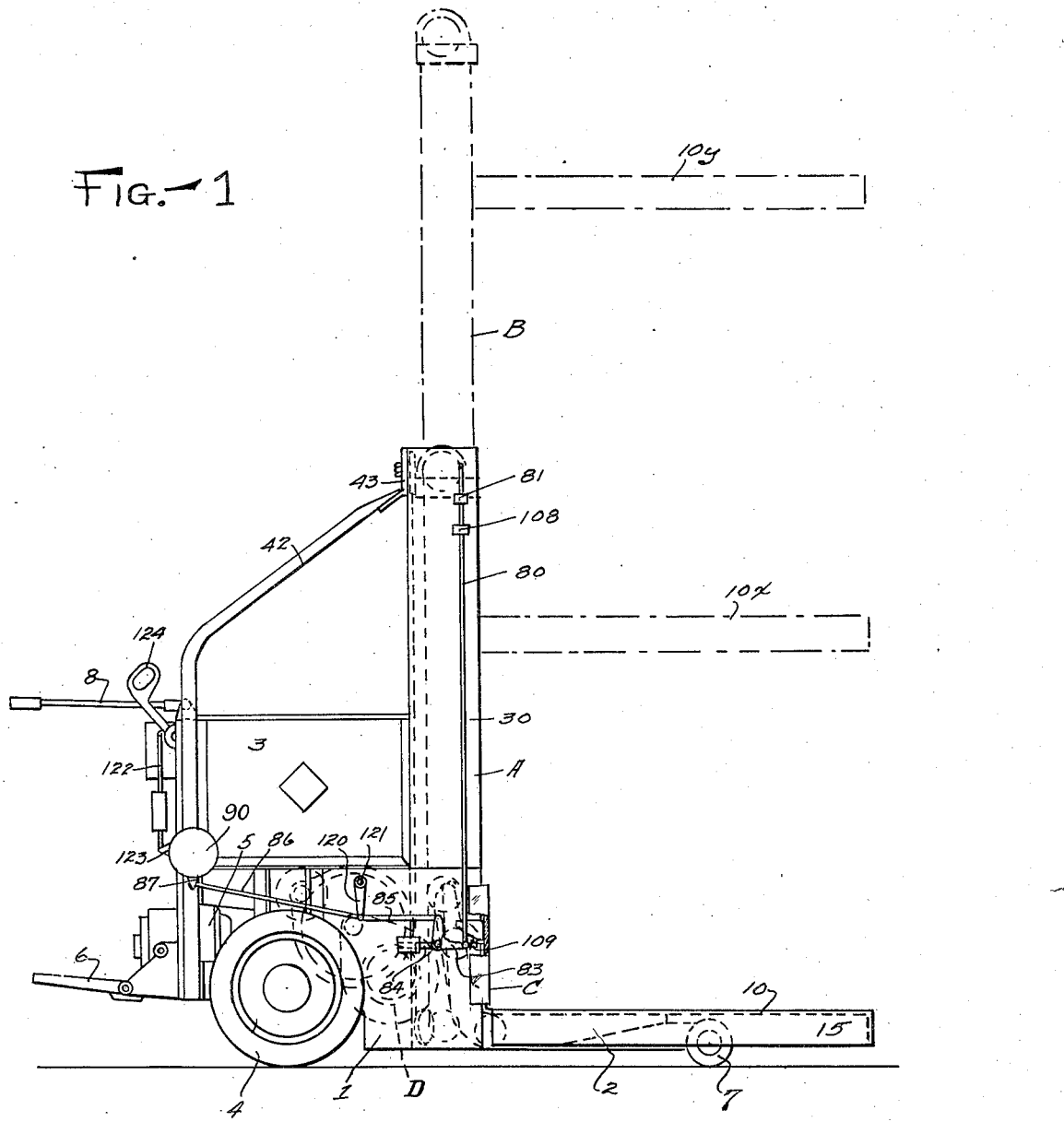
Figure 2:
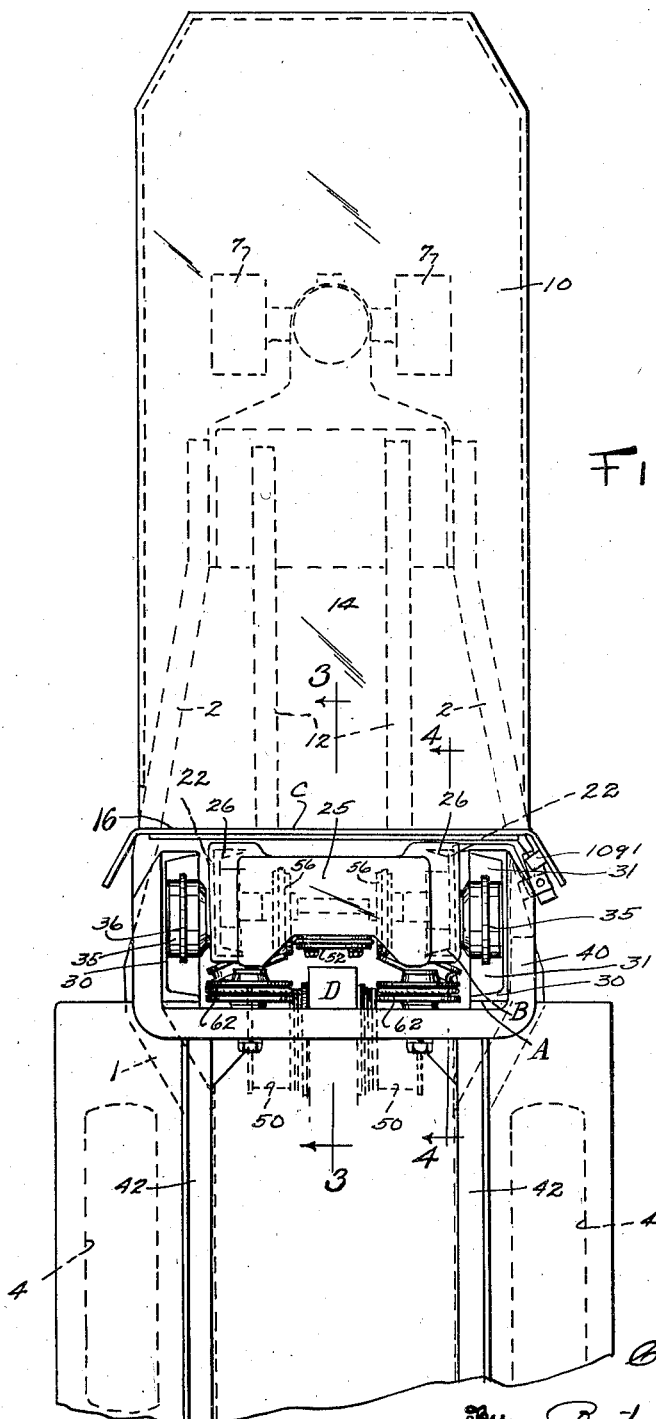
Figure 12:
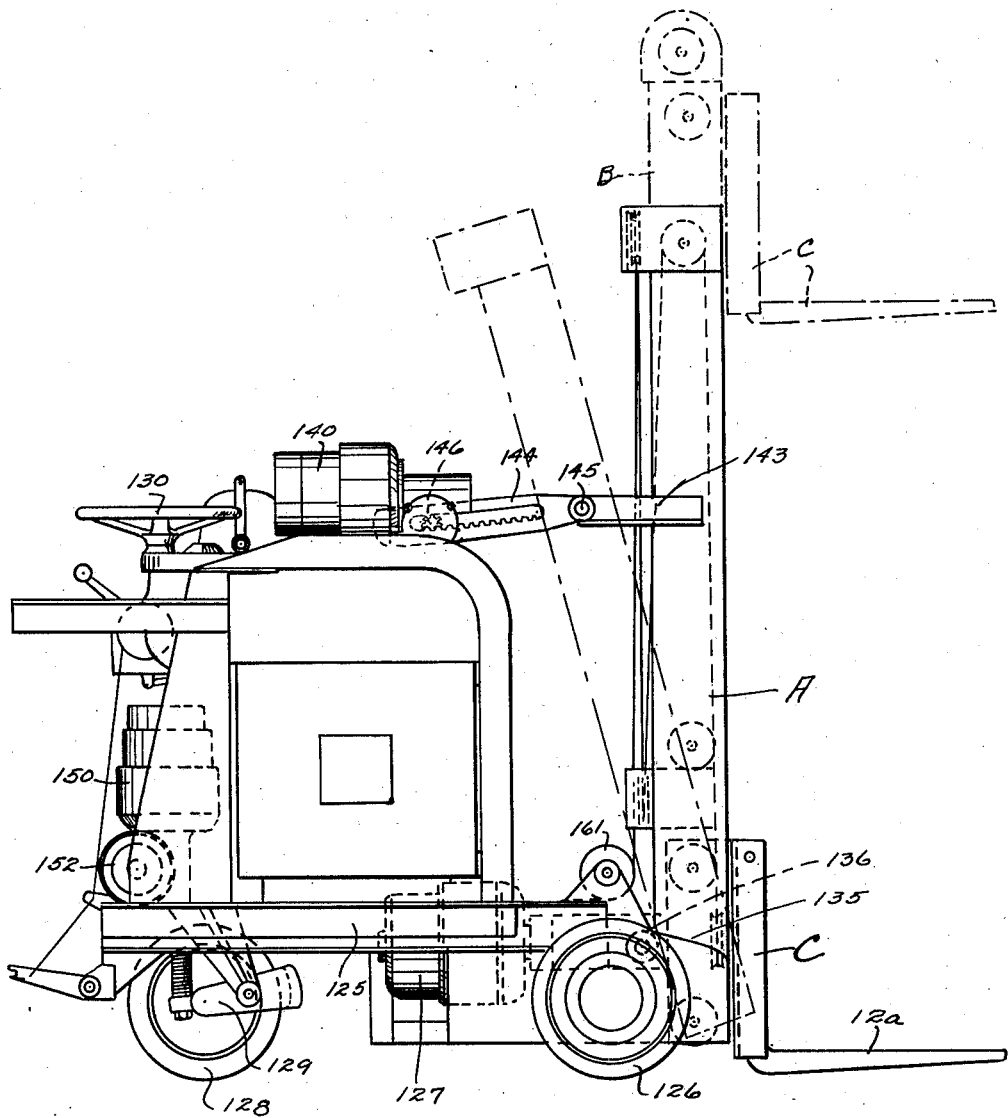

In the drawings, Fig. 1 is a side elevation of an industrial truck incorporating an embodiment of the present invention, the view illustrating diagrammatically the operating capabilities thereof; Fig. 2 is a fragmentary plan view of the truck including a platform, the lift mechanism and a rearward portion of the main frame; Fig. 3 is a sectional view taken substantially along the line 3—3 on Fig 2 and showing parts of the tiering mechanism in one position; Fig. 4 is a fragmentary sectional view of portions of the platform and carriage therefor, the section being taken substantially along the line 4—4 on Fig. 2; Figs. 5 and 6 are views similar to Fig. 3 and taken along substantially the same section line, but showing the various parts in different relationships; Fig. 7 is a transverse sectional plan view taken substantially along the line 7—7 on Fig. 4; Fig. 8 is a cable and sheave diagram; Fig. 9 is an electric diagram showing a suitable electric control mechanism to cooperate with the automatic control devices; Fig. 10 is an elevation illustrating a suitable power operated hoisting mechanism; Fig. 11 is a transverse section and is indicated by the offset lines 11—11 on Fig. 10; Fig. 12 is a view similar to Fig. 1 of a different modification of the invention, including a different form of industrial truck; Fig. 13 is a plan of the truck shown in Fig. 12, and Fig. 14 is a diagram showing the arrangement of cables and sheaves preferably used in connection with the form of the invention shown in Figs. 12 and 13, but which cable and sheave arrangement is also applicable to the both general modifications illustrated herewith; Fig. 15 is a view similar to Fig. 12 and illustrates a modified form of the invention; Fig. 16 is a diagram showing the arrangement of cables and sheaves preferably used in connection with the form of the invention shown in Fig. 15; Fig. 17 is a fragmentary elevation similar to Fig. 12 and illustrates a different modification of the invention; Fig. 18 is a fragmentary front elevation of the form of the invention shown in Fig. 17; Fig. 19 is a horizontal section and is indicated by the lines 19—19 on Fig. 18.

The general arrangement as shown comprises a relatively fixed elevator guide A, suitably attached to the truck frame, this elevator guide being shown in Fig. 1 as rigidly attached to the frame and in Fig. 12 as pivotally attached. The attached guide supports a movable guide B, the two guides being in telescoping relation and the movable guide carrying an elevator carriage C for a suitable load engaging and lifting means such as a platform or spaced fork elements. The platform or other lifting means is adapted to be positioned at a comparatively low level for picking up and depositing loads at such level. The carriage C operates in the movable guide B and is raised and lowered thereon, and when the upper limit of movement of the carriage has been reached, the load engaging means may then be raised further by extending the movable guide with reference to the attached guide. There is a suitable power hoist D, electrically driven as shown, and which may be variously positioned with reference to the frame of the truck, the hoist operating a special cable and sheave arrangement to raise and lower the movable guide on the attached guide. The characteristic features of the above outlined mechanism, and the novel relationships will now be described in detail.

Referring to Figs. 1 and 2, the truck comprises a main chassis or frame 1 having a low slung rearward extension 2 and an upright battery housing 3. Suitable traction wheels are disposed on the main frame beneath the battery housing as at 4 and these wheels may be dirigibly or non-dirigibly arranged as desired. The wheels are arranged to be driven by a suitable motor and gearing, the motor being shown at 5 adapted to be controlled by the operator who stands on a forwardly extending platform effect 6. The low slung extension 2 supports a set of small wheels at 7, preferably dirigibly arranged, and adapted, by suitable mechanism (not shown) to be controlled by the operator through a steering arm or equivalent device shown at 8 above the platform 6.

The load platform may be of any convenient type and is indicated generally at 10. The main frame of the platform carriage C, is indicated at 11, and has rearwardly extending arms 12 lying beneath the platform. The platform is of conventional construction and comprises a main surface portion 14 with downturned strengthening flanges 15 adapted to lie outwardly from the low slung frame extension 2, and the platform may be secured in place, for example, by a guard apron 16 overlying an upwardly turned flange 17 on the forward end of the platform.

The carriage C, as shown, has suitable guiding wheels or rollers 20 and 21 at each side thereof, which engage suitable guiding strips on the movable elevator guide B. The guide B comprises inwardly facing structural channels 22 with bearing strips 23 mounted between the flanges on which the rollers 21 are adapted to bear. The rollers 20 of the carriage may bear directly on the outer surfaces of the rearmost flanges of the channels 22. It is, of course, necessary to provide suitable bracing between the channel members 22, which bracing comprises particularly a housing or cap 25, the general shape of which is best shown in Figs. 2 and 3, the cap having downwardly extending flanges 26 embracing the upper ends of the channels 22 on at least three sides, and being riveted or bolted thereto in any suitable way. If desired, the channels may also be braced and connected at their lower ends, but such bracing is not essential in the present arrangement.

The attached elevator guides A, in which the movable elevator guides telescope, comprise, as shown, structural channels 30 with inturned flanges, there being bearing strips at 31 mounted within the respective flanges of the channels which bearing strips are grooved as at 32 substantially throughout the length of the strips. Near the lower ends of the movable elevator guide channels 22 are spaced rollers 35, there being two pairs of these rollers, one pair above the other, and each of the rollers having a peripheral tongue 36 entering the respective grooves 32. Because the lower end of the movable guide channels 22 are free from each other, it is obvious that when the carriage C is raised away from the lower ends of these channels, the channels are unbraced at their lower ends. At such time, assuming the position 10x of the platform, (see Fig. 1), the lower ends of the channels are prevented from swinging inwardly by reason of the arrangement of rollers and guides between the guide channels 22 and 30. As shown, there are paired tongued rollers 35 on the guide channels 22, which tongues run in the grooves 32 on the bearing strips 31 of guide members 30, and it will be seen that notwithstanding the position of the carriage with relation to the movable guide, and the relative position of the movable guide and attached guide, the channels will be maintained in parallelism at all times. The diameters of the rollers are slightly less than the distance between adjacent bearing strips 31 to allow for free movement of the rollers up and down the guideways while preventing any appreciable tipping movement of the free end of the inner guide, when in the raised position.

To support the structural members of the attached guides, the lower ends of the channels 30 may be securely fixed to the main frame by suitable gusset plates (not shown), and in addition, the foremost flanges of these channels may be securely bolted to the upright battery housing portion of the main frame. Since the channels 30 extend a considerable distance above the housing, it is, of course, highly desirable to brace the upper ends of the channels and for this purpose I may provide a rigid channel 40 bent into a U shape, the web portions thereof, near the ends, lying flat against the webs of the channels 30, and being rigidly secured thereto. This member 40 is, as shown, secured to the forward portion of the truck frame by diagonally running struts 42 (structural angles, as shown) attached by suitable bracket 43 to the member 40 and being suitably bolted or otherwise rigidly attached to portions of the main frame. It will be seen that the movable elevator guide B may telescope entirely within the attached guide, including the members 30, the relationship of the various parts, allowing this, being well shown in Figs. 2 and 7.

Referring now to the means for raising and lowering the carriage C on the movable guide, and the movable guide on the attached guide to elevate the load, this may, of course, be considerably modified. As shown, however, this comprises an arrangement of sheaves and cables and a suitable hoist by which tiering operations, with maximum loads consistent with safety, may be very effectively handled for usual and unusual heights, four such arrangements being shown in the drawings. It is sometimes desirable that the loads to be handled should be limited in size in proportion to the height at which such loads are raised, mainly from the standpoint of safety. This will be clear from a glance at Fig. 1, wherein it will be seen that it would be perfectly safe to move a very heavy load to the height of the platform shown at 10x in broken lines, notwithstanding the fact that the truck may be positioned on a slight rearward incline, that is, tending to run down hill backwards; whereas with a platform raised to the height indicated at 10y, the load should be decreased in weight or the whole truck would be likely to tip over rearwardly. Now, there is, of course, no way in which overloading the platform can be absolutely prevented, but by the present arrangement an excessive load on the platform may be easily prevented from being raised past, say the position 10x. The manner in which this safety feature operates will be demonstrated presently in connection with the description of the cable and sheave arrangement.

A suitable form of motor-driven hoisting mechanism is shown in Figs. 10 and 11. Such mechanism may comprise a motor 70 equipped with an electric brake, not shown in detail, but the position of which is indicated at 71, which brake, upon deenergization of the motor, is automatically applied to prevent free turning of the armature shaft. The armature shaft drives a pinion 72, meshing with teeth of a gear 73 having rigid therewith a pinion 74, which latter drives still another gear 75 for further reduction. The gear 75 has a pinion rigid therewith on a stub shaft 76, which pinion meshes with a large drum driving gear 77, freely journalled on the driving shaft 51 for the drums 50. The drum driving gear 77 is connected with the drum shaft through a system of ratchet pawls, there being three pawls 78 pivotally mounted on the large drum driving gear 77. Suitable springs 78a urge the pawls inwardly toward a ratchet wheel 79, which is rigidly connected to the drum shaft 51 and has, as shown, five notches 79a to co-operate with the pawls.

In operation, when the motor is started to wind the cables to elevate the load, one of the pawls is active to drive the drums. If, however, the load is very light, the drums may have a tendency to run faster than the driving gear 77, in which case the then active pawl backs out of its notch and another of the pawls drops into another of the notches, thus taking up the slack and preventing tangling of the cable stretches at the drums. When lowering a load, the motor is, of course, reversed, and if operated at a speed greater than enough to simply hold tension in the cables, the pawls will run from one notch to another, wherefore the cables will not become loosely wound on the drums and thus become tangled or allowed to run freely from the drums. During such lowering, a brake 70b on one end of the drum shaft is automatically applied by reason of a suitable spring arrangement (not shown) but which acts on the brake to hold the cable in tension at all times. The brake is of the type which when the drum is rotated in one direction, tends to free the drum and when the drum is rotated in the opposite direction the brake tends to grip the drum.

In the form shown in Figs. 1 to 11 inclusive, the cable has its central portion sustained by a suitable equalizer bar 52 pivotally mounted on the cap housing 25 of the movable guide, and from the equalizer the cable stretches extend downwardly at 53 to sheaves 54 on the carriage portions 11, thence upwardly as at 55 to sheaves 56 housed in the cap 25 and freely journalled on a cross shaft 57 mounted therein at its ends. From the sheaves 56, the cable stretches pass downwardly, as at 58, to diagonally positioned sheaves 59 secured to suitable brackets 60 on the lower ends of the movable guide channels 22. From the sheaves 59, the cable stretches pass upwardly, at 61, over fixed sheaves 62 on the cross frame member 40, and thence downwardly at 63 to the drums 50. The cable may thus comprise a single section of cable of suitable length which will be automatically equalized to lift evenly on both sides of the elevator elements, it being understood that the equalizer block may move slightly, as required, to maintain the cable equally taut at both sides.

It will now be seen that reeving in one of the cables by means of the drums 50 will result in first raising the platform 14 and its carriage C along the movable guide B but without moving this guide. This occurs notwithstanding the weight of the load, and even though there may be greater frictional resistance tending to hold back the carriage on the movable guide than between the movable and attached guide, because of the fact that the cable stretches supporting the carriage C operate at twice the mechanical advantage as do the cable stretches which tend to lift the movable guide. The weight of the carriage and the load thereon is sustained by four cable stretches, two at 53 and two at 55, and the load will move upwardly at half the speed at which the stretches 63 for example, are wound on the drums, as will be obvious from the diagram, Fig. 8. Now, when the carriage reaches its uppermost position on the movable guide (see Fig. 5), relative movement between the guide and the carriage will cease, due to the contacting of the carriage with the cap 25. It will be seen that the stretches 61 will now become active to raise the movable guide B just as though the stretches 53—55 and the corresponding sheaves were not present. Thus, because the carriage, platform and load now becomes virtually a part of the movable guide, the whole mechanism is raised at the speed of drawing in on the cable stretches 63.

A simple device for preventing overloading when raising beyond the load carrying position indicated in Fig. 5 would be to provide slip clutches in connection with the drums which would simply negative the action of the motor and gearing 71—72 on the drums, but without applying sufficient power to the drums to break the cables. No illustration of this is deemed necessary; such clutches being well known in this art. However, the power of the motor may also be limited in such manner that, while it is adequate to support the maximum load on the four-part cable for the raising distance determined by the travel of the carriage on the movable guide, this power would not be great enough to move such maximum load, together with the added weight of the movable guide structure, on a two-part cable. The result of overloading, for high lift, would then be simply to stall the motor, but without any damage resulting to any of the mechanism.

A suitable mechanism is provided to limit the upward movement of the load to such height that the telescoping support between the movable and fixed guides will always be adequate. Likewise, means are provided for limiting the downward travel of the carriage to thus prevent tangling of the cables after the carriage and platform reach their lowermost position as limited by the subframe 2 of the truck. The limiting device is best shown in Figs. 1, 2, 7 and 9, and comprises a vertical bar 80 which is supported in a convenient position on the side of one of the attached guide channels 30. This bar is slidable in suitable brackets, one of which is shown at 81. The bar 80 is connected at its lower end to a bell crank 83 pivoted to the truck frame, as at 84. The bell crank is connected, through a two-part link having sections 85 and 86, with an arm 87 of a controller drum 90 (see Fig. 9). The drum may be of any suitable character, that shown being illustrative only. The drum has a plurality of segments 91, 91a and 91b, electrically connected at all times by suitable conductor means 94, and also segments 95 and 95a, which are electrically connected by suitable means indicated at 96. There are brushes at 97 and 98 which operate in fixed position, that is to say, they do not turn with the drum, and are electrically connected to the field windings 70a of the hoisting motor 70 by suitable conductor 72a. There are also brushes 100 and 101 connected by suitable conductors with the electric power supply, such as the main battery of the truck, shown diagrammatically at 102, these brushes being in contact with the segments 91a and 95 at all times. There is also a brush 105 which may be electrically associated with the brush 100 when the motor is energized, as will be presently seen, and this, through the intermediacy of suitable conductors 106 and 107, places the armature of the motor in shunt electrical connection with the field.

The bar 80 has near its upper end a stop 108 and near its lower end a stop 109. The movable guide B carries an overhanging abutment 108' which contacts with the abutment 108 on the upper end of the bar, when the guide B is drawn upwardly to a predetermined height considered the maximum height, consistent with safety, to move the controller in a clockwise direction, from the position shown in Fig. 9. Likewise the carriage C has an overhanging abutment 109' which contacts with the limit stop 109 at the lower end of the control bar 80 when the carriage reaches its lowermost position (or just before it has reached this position), which turns the controller drum 90 in a counter-clockwise direction from that illustrated. The results of the operations just described are as follows:

The carriage C may, of course, move upwardly with safety without any special limiting means until it strikes the housing 25 or a portion thereof, whereupon, assuming the platform is not overloaded, the inner guide will then be drawn upwardly until the operator stops it by hand, or until the safe limit has been reached, and the abutment 108' strikes the abutment 108. Assuming the latter condition, the clockwise movement of the controller drum now throws the whole mechanism into neutral, (such position being shown in Fig. 9). The motor is now deenergized because the field winding circuit is opened by the brushes 97 and 98 standing between the adjacent drum contacts, the armature circuit being also opened by reason of the brush 105 standing between adjacent contacts, but out of electrical contact therewith, simultaneously the motor brake 71 is applied to the armature shaft. The operator may now manually turn the controller in a counter-clockwise direction, by means of suitable link 122 interposed between an arm 123 on the control drum and an operating handle 124 on the main truck frame, which will energize the motor to pay out the cable in a direction to lower the platform. The circuits established to do this are as follows:

From the battery, current passes through the brush 101, contact 95, contact 95a, brush 98 to the field 70a and back through the brush 97, contact 91b, contact 91a, brush 100 to the battery. Also, current may now pass through the brush 100, contact 91a, brush 105, and conductor 106 to the armature windings and thence back through conductor 107 to the opposite pole of the battery.

Now, when the movable elevator guide has been lowered and the platform has also been lowered, both to their bottommost positions, and in the event the operator fails to adjust the control to stop the lowering movement at the proper time, the arm 109' on the carriage C will engage the abutment 109 on the control bar 80, thus through the linkage described rotating the controller drum out of the position just described and into the neutral position shown in Fig. 9. Subsequently the operator may move the control drum in a clockwise direction and thus reverse the direction of rotation of the motor as follows: When the drum is rotated a short distance clockwise from the neutral position shown in Fig. 9, the armature is energized with the same polarity as before, as will be obvious (contacts 91a and 91b being interconnected electrically), but the polarity of the field is reversed because the current passes to this through the brush 100, contact 91a, contact 91 and brush 98 to the field rather than passing from the brush 100, contacts 91a, 91b and brush 97 to the field.

The above electrical controlling arrangement has, as previously indicated, been given only by way of example of a suitable electric hook-up for accomplishing the desired results, and all this electrical mechanism is subject to considerable modification.

In the above described arrangement, it is sometimes desirable to operate the truck in low overhead clearance spaces as a tier lift truck, but at such time with limited tiering height capacity. In such cases, the limit stop 108 may be swung around on the control bar 80 to such position that it will engage the abutment 109' (see Fig. 7) of the carriage C instead of the abutment 108' on the movable guide B. Thus when raising an extremely heavy load on the platform the operator will not be able to drive the platform carriage C to such height that it may strike the cap housing 25, as it might ordinarily, thus straining the cables. Of course, the truck is equipped with a cable strong enough to prevent breakage in case of such overload being imparted to the cable at no mechanical advantage, wherefore the suggested modification is not essential but merely desirable in special cases.

Referring now to the modification of the invention shown in Figs. 12 to 14, it will be seen that the attached guide A is mounted at the extreme rear end of the truck rather than amidships, and further that this guide A is pivotally mounted rather than rigidly. The general arrangement of telescoping elements A and B, comprising the attached and movable guide members and also the arrangement of the carriage C on the movable guide member, is substantially the same as before, and the parts are similarly numbered. However, the hoisting mechanism is modified to the extent of providing a cable and sheave arrangement by which the hoisting unit (shown as mounted forwardly) operates both the load lifting carriage on the movable guide, and the carriage and movable guide on the attached guide, at the same mechanical advantage. The load lifting means on the carriage C comprises spaced fork arms 12a of any suitable construction.

The truck as shown, has a frame 125, at the rear end of which there are a pair of traction wheels 126 arranged to be driven by a suitable motor 127 located rearwardly and in a plane between the wheels, there being suitable reduction gearing interposed between the motor and the axle or axles for the wheels (not shown). The truck has a single forwardly disposed dirigible wheel at 128 mounted on a suitable rocking frame 129 and arranged by suitable means to be turned to steer the truck through a suitable steering column (not shown) and a steering wheel 130 within reach of the operator.

The channel sections of the attached guide A carry suitable brackets, one on each side, as at 135 (one being shown), which brackets pivotally engage a suitable cross bar 136 rigidly supported by the main truck frame 125 and about which the attached elevator guide pivots.

As shown in Figs. 12 to 14, this modification embodies a separate motor 140 and suitable gearing for tilting the elevator guides about the pivot 136, it being understood that such tilting is desirable, both to retain the load in place on the load engaging members 12a and to carry the load, particularly when disposed at comparatively high elevations, toward the center of the truck. As illustrated, the tilting means includes the bail-like connecting frame member 143, the ends of which embrace and are attached to the outer structural elements of the attached guide and there being a rack bar 144 pivoted as at 145 to the bail. The rack bar extends in meshing engagement with a suitable pinion 146 on the final driven shaft of the motor and gearing unit 140. Reference is directed to the prior Patent (owned by the assignee hereof) No. 1,753,731, April 8, 1930, for a similiar arrangement for tilting a tier lift guide.

The motor and cable drum driving gearing may, in general, be substantially as heretofore described with reference to Fig. 10, but in Fig. 12 the motor, the gearing and the winding drums are placed forwardly of the battery housing, mainly to provide clearance for swinging the attached elevator guide about the pivot center 136. The winding motor is indicated at 150 and the position of the drums at 152. The opposite ends of a suitable cable are attached to the winding drums as before (see Fig. 14) and the cable stretches are as follows:

The center section of the cable passes under a single sheave 153 on the carriage C and thence upwardly at 154 over sheaves 155 near the upper end of the elevator guide B. From the sheaves 155, the cable passes downwardly as at 156 to sheaves 157 near the lower end of the guide B, thence upwardly, as at 158, over sheaves 159, near the top of the attached elevator guide A, thence downwardly, as at 160 under guide sheaves 161, on the truck frame, and thence forwardly to the winding drums.

The arrangement for stopping the motor of the winding mechanism and for controlling a suitable brake or brakes, to prevent tangling of the cable stretches, is not illustrated in connection with Figs. 12 and 14, but it may be assumed that the arrangement is substantially the same as that illustrated in connection with Figs. 1, 7 and 9. If desired, this may be further modified in accordance with the Patent No. 1,738,172 above mentioned, which shows a limit control arrangement, particularly adapted for use in connection with a tilting guide for a tier lift load carrier.

It will be seen that with the arrangement shown in Figs. 12 to 14, the combined weight of the load on the fork arms 12a and the weight of the movable guide, prevents any upward movement of the movable guide B until the cable stretches 154 are substantially taken up, (carriage C moved to its upper limit). Thereafter further reeving in on the cable takes up the stretches 156 and 158 to raise the movable guide with reference to the attached guide, carrying the load on the carriage to such greater height as may be desired.

The arrangement is such that the motor operates with the same mechanical advantage in raising the carriage on the movable guide as it operates to raise the movable guide on the attached guide, but because the combined weight of the movable guide, the carriage and the load thereon is greater than the weight of the carriage and load, the resulting first operation is to raise the lesser load, and the movable guide retains its position until the cable stretches 154 are taken up. If desired, and in order to positively prevent premature movement of the movable guide, in case frictional conditions favor movement of the movable guide rather than movement of the carriage C, the movable guide may be equipped with any suitable latch (not illustrated) and the carriage with an actuator therefor, so arranged that the latch holds the movable guide in lowered position, with respect to the attached guide, until the carriage is raised to a predetermined height.

Referring now to the modification of the invention shown in Figs. 15 and 16, it will be seen that the telescopic guide B is spaced slightly rearwardly of the stationary guide or attached guide A. The rollers 35, being carried by a rearwardly extending portion b of the telescopic guide B. This form or arrangement of telescopic elements A and B permits greater space to accommodate the cable arrangement. In this modification, the cable is so arranged that the load lifting carriage is raised relative to the movable guide at the same mechanical advantage as the movable guide is raised relative to the attached guide.

The general arrangement of the truck frame and cable driving units may, in general, be substantially as heretofore described, with reference to Fig. 1. The cable arrangement is, in this instance, somewhat different. The center section of the cable passes under a single sheave or equalizer 170 on the carriage C, and then upwardly as at 171, over sheaves 175, mounted on a shaft 176, rotatively carried at the upper end of the guide B. The cable then passes downwardly, as at 177, to sheaves 178, mounted on the carriage C, and then upwardly, as at 179, to a second pair of sheaves 180, mounted on the shaft 176; thence downwardly, as at 181, to sheaves 182, journalled on shafts 183, mounted in the rearwardly extending portion b of the guide B; thence upwardly, as at 184, over sheaves 185, journalled on a shaft 188 which is mounted in the upper portion of the attached guide A; thence downwardly, as at 186 to a second pair of sheaves 187 mounted in the lower portion of the guide B; thence upwardly as at 189, around sheaves 189, mounted on the shaft 188, and thence rearwardly as at 191, to the winding drums 50a.

This arrangement of cable weaving is such that it gives the same added mechanical advantage to both the lifting of the carriage C in the guide B, as well as the moving of the carriage C and the guide B in the attached guide A.

The construction shown in Figs. 17, 18 and 19 is adapted for use where it is not necessary to raise the carriage to extreme heights, but where it is desirable to raise the carriage slightly higher than would be possible where the carriage were mounted directly to the guide A.

As shown in Figs. 17 and 18 and 19, the general arrangement of the truck is similar to that shown in Fig. 11. However, these figures illustrate a modified form of mounting between the carriage C and the telescopic guide B. As shown in Figs. 17 and 19, the attached upright A comprises a pair of channels 200, between which is mounted the telescopic guide B, which, in this instance, comprises a carriage 201, having a pair of rollers 202 located at either side thereof and which engage the flanges of the channels 200. Rigidly secured to the carriage 201 is a face plate 205, which extends in front of and to each side of the channels 200. This face plate 205 in turn carries the load supporting member C, which comprises a plurality of L-shaped members 207, rigidly secured to a plate 208, which carries guides 209 adapted to embrace the plate 205. Suitable rollers 210 may be interposed between the guide 209 and the plate 205, to decrease the friction therebetween. The arrangement is such that the load engaging member C may be moved vertically relative to the plate 205, and the plate and load supporting member may be moved as a unit in the attached guide 200.

In the form shown in Figs. 17 and 18, the midportion of the cable passes around a pulley or equalizer 220, which is carried by a bracket 221. The bracket 221 is rigidly secured to the load supporting plate 208, and passes through a slotted opening 220a in a plate 205. From the pulley 220, the cable passes upwardly around sheaves 222, journalled on a shaft 223, mounted in suitable bearings in a cap 224, which is secured to the upper ends of the upright guides 200. From there the cable stretches downwardly around suitable pulleys 225, and thence rearwardly, as at 226, to the winding drums.

The winding drums and motor for driving the same are substantially the same as heretofore described with reference to Figs. 10 and 11. The arrangement is such that when the cable is reeved on the winding drum, it will exert an upward pull on the pulley 200 and raise the plate 208 and load supporting carriage C until the upper portion of the bracket 221 engages the uppermost limit 230 of the slot 220a. When the load supporting member 206 has been raised sufficiently to cause the bracket 221 to engage the uppermost end 230 of the slot 220a in the carriage plate 205, the latter will be caused to move upwardly with the load supporting carriage as a unit. As shown in Fig. 17, this arrangement permits the load engaging carriage 207 to be raised slightly higher than would be possible, were it to be directly secured to the plate 205. This difference is indicated by the position of the carriage shown in 207a, which position is the result of the mechanism described, and the position indicated at 207b, which would be the extreme uppermost position of the carriage, were it attached directly to the plate 205.

I claim:

1. In an industrial truck, a frame, wheels supporting said frame, an attached elevator guide mounted on said main frame, a movable elevator guide on the attached guide, and a load lifting carriage mounted on said movable guide for movement thereon, a cable system and winding mechanism therefor, said cable system including cable sustaining means near the top of the movable guide, a sheave on the carriage, a sheave near the top of the movable guide, another sheave near the bottom of the movable guide and means to guide a cable from the last named sheave to the winding mechanism, there being a cable passing from said cable sustaining means about said sheaves and guiding means in the order stated, whereby the carriage will be moved substantially to its full height on the movable guide before the movable guide will move on the attached guide and whereby further reeving of the cable will then result in moving the movable guide together with the carriage for high tiering operations.

2. In an industrial truck, a frame, wheels supporting said frame, an attached elevator guide mounted on said frame, a movable elevator guide on the attached guide and a load lifting carriage mounted on said movable guide for movement thereon, a cable system and winding mechanism therefor, said cable system including cable sustaining means near the top of the movable guide, a sheave on the carriage, a sheave near the top of the movable guide, another sheave near the bottom of the movable guide and a sheave near the top of the attached guide, there being a cable passing from said cable sustaining means about said sheaves in the order stated and thence to said winding mechanism.

3. In an industrial truck, an attached elevator guide on the truck, a movable elevator guide in telescoping relation to the attached guide, and a load lifting device guided for movement on the movable guide, power means for raising the load lifting device on the movable guide and the movable guide on the fixed guide in succession, and a power transmission means to cause the load lifting device to be moved on the movable guide at greater mechanical advantage than the movable guide is moved on the attached guide.

4. In an industrial truck, an upright elevator guide in fixed position on the truck, a movable elevator guide mounted on the fixed guide for raising movement relative thereto and a load lifting member mounted on the movable guide for raising and lowering movement relative thereto, means for successively moving the load lifting member and movable guide for high tiering operations, said means including an electric motor and connections therefrom to the respective raisable elements stated, and a control mechanism for the motor including an actuator for stopping the motor, said actuator being operated by the load lifting member at substantially its low limit of movement and there being a settable device whereby the load lifting member will operate the actuator at the upper limit of its movement on the movable guide at one setting of said device, and whereby the movable guide will operate said actuator at the upper limit of the movement of the movable guide at another setting of said device.

5. In an industrial truck, a substantially upright elevator guide mounted on the truck, a movable elevator guide supported on the first named guide in telescoping relation thereto, antifriction means between the two guides including tongued rollers on one of the guides and grooved trackways therefor on the other guide, a load lifting device on the movable guide, and a power operated winding means and connections therefrom to the movable guide and lifting device, and wherein said connections are arranged to move the load lifting device along the movable guide and then automatically move the movable guide with reference to the first named guide.

6. In an industrial truck, a main frame, supporting wheels therefor, an upright elevator guide secured to said main frame, said guide including grooved trackways at each side thereof, a movable elevator guide having tongued rollers embraced by the grooves of the first mentioned guide for true parallel movement between the movable and fixed guide, a load elevator device movably mounted on the movable guide, and means for successively operating the elevator device on the movable guide and the movable guide on the first named guide.

7. In an industrial truck, a main frame and an elevator guide attached thereto, a movable elevator guide adapted to be raised and lowered on the attached guide, a load lifting device mounted on the movable guide, power mechanism with connections to the said device and movable guide to raise the same sequentially, said connections including a cable and guiding elements therefor on the guides and load lifting device, and wherein the lifting device and the movable guide are suspended from the movable guide and attached guide respectively with the same number of cable stretches.

8. In an industrial truck, a frame, an elevator guide carried on said frame, a movable guide in telescopic relation to said elevator guide, a load lifting device movably mounted on said movable guide, power means adapted to move the load lifting device on the movable guide and the movable guide on the elevator guide, wherein said power means includes a system of cables and a winding mechanism therefor, and means included in said cable system to operate the load lifting device on the movable guide at a greater mechanical advantage than the movable guide is operated on the elevator guide.

9. In an industrial truck, a substantially upright elevator guide attached to the truck, a movable elevator guide supported on the attached guide in telescoping relation thereto, anti-friction means between the two guides including tongued rollers on one of the guides and grooved trackways on the other guide, a load lifting device on the movable guide, means to move the load-lifting device relative to the movable guide, before the movable guide is lifted relative to the attached guide and when the weight of the load on the lifting device is greater than the weight of the movable guide, and wherein said last named means includes a load lifting cable, a sheave on the load lifting device, and supporting means on the movable guide for said cable.

EDWARD J. ABBE.